United States Patent [19]
Chenel

[11] Patent Number: 4,778,487
[45] Date of Patent: Oct. 18, 1988

[54] DEVICE FOR ASSEMBLING THE FRAMEWORK OF A TEMPORARY EXHIBITION STAND

[76] Inventor: Guy G. Chenel, 70, rue Jean Bleuzen, 92170 Vanves, France

[21] Appl. No.: 33,320

[22] Filed: Apr. 1, 1987

[30] Foreign Application Priority Data

Apr. 11, 1986 [FR] France .............................. 86 05202
Jun. 24, 1986 [FR] France .............................. 86 09090

[51] Int. Cl.$^4$ ......................... F16B 21/00; E04H 1/06
[52] U.S. Cl. ..................... 52/239; 52/238.1; 248/221.3; 403/255; 403/325; 403/328
[58] Field of Search ......................... 52/36, 238.1, 239; 248/221.3, 221.4; 211/182; 403/327, 325, 328, 254, 255

[56] References Cited

U.S. PATENT DOCUMENTS

| | | | |
|---|---|---|---|
| 3,189,140 | 6/1965 | Luss | 52/36 |
| 4,165,588 | 8/1979 | Bayley | 52/36 |
| 4,641,983 | 2/1987 | Strassle | 403/255 |

FOREIGN PATENT DOCUMENTS

| | | | |
|---|---|---|---|
| 415999 | 1/1967 | Switzerland | 248/221.3 |
| 8303868 | 11/1983 | World Int. Prop. O. | 52/238.1 |

*Primary Examiner*—David A. Scherbel
*Assistant Examiner*—Michael Safavi
*Attorney, Agent, or Firm*—Seidel, Gonda, Lavorgna & Monaco

[57] ABSTRACT

Device for assembling the framework of a temporary exhibition stand; characterized in that the uprights (8) comprise at their top ends longitudinal slots ($8_3$) situated in the bottom of dovetailed grooves ($8_1$), the said slots ($8_3$) terminating at the top end of the uprights which is adjacent the end of the top cross-member which is to be assembled and in that a hub (19) is disposed in these slots, the hub comprising at least one heel (22) disposed transversely in a dovetailed groove ($8_1$), at least one ball (29) maintained in an orifice in the hub in such a way as to project into the dovetailed groove above the heel and also comprising a rod (25) sliding in the hub against the action of a spring (28), the said rod being provided with a notch (26) and being capable of assuming two positions, in one of which the notch (26) in the rod (25) is situated at the level of the ball (29) and allows it to be released from the groove to allow passage of the bolt (7), while in the other position, the rod (25) locks the ball (29) in a position in which it projects into the groove ($8_1$) maintaining the bolt either in a high position, above the ball, or in a low position, between the heel and the ball.

10 Claims, 7 Drawing Sheets

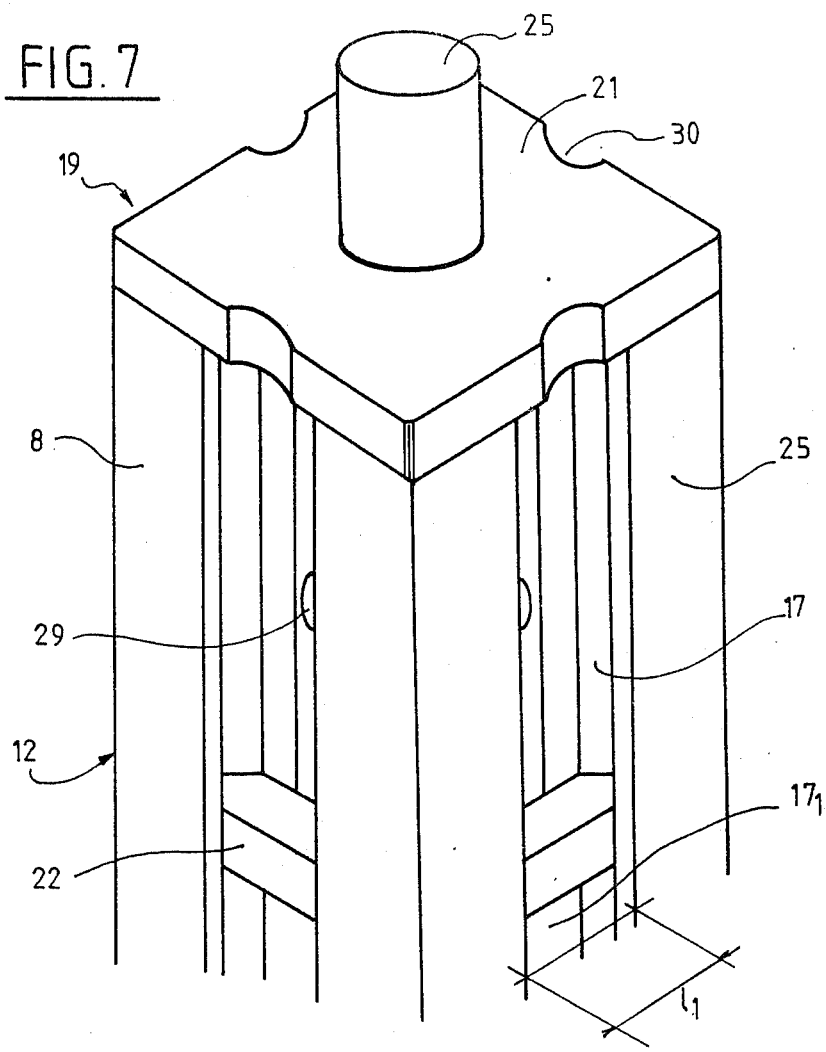
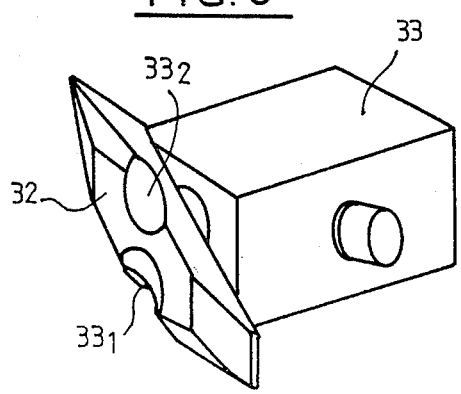
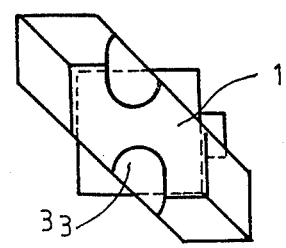

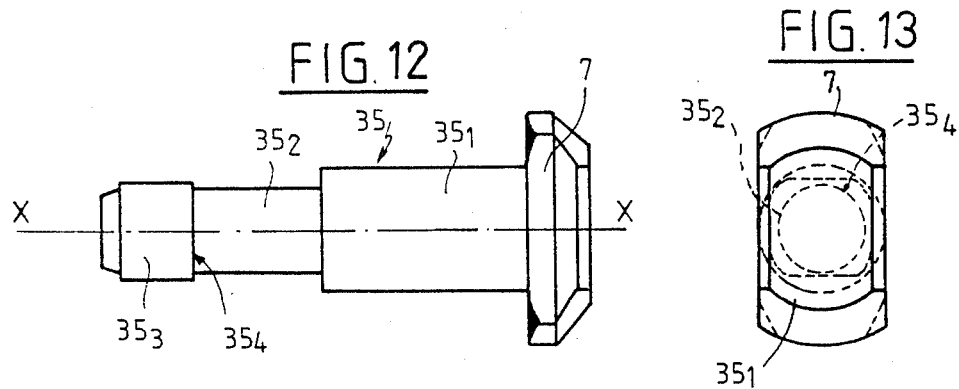
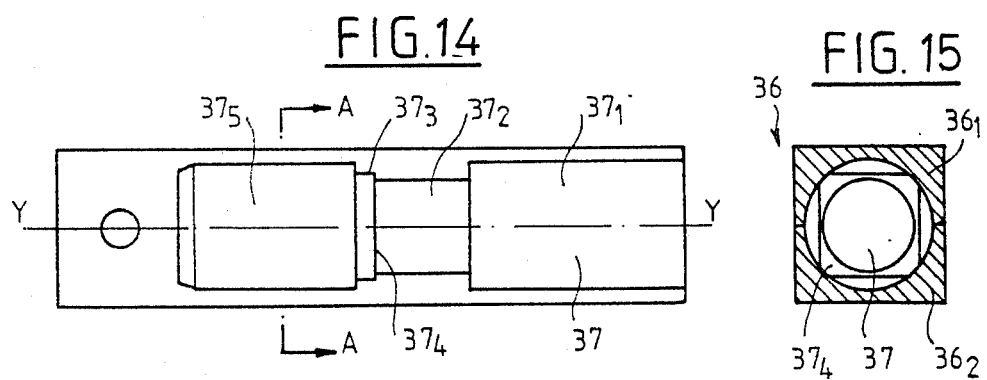

DEVICE FOR ASSEMBLING THE FRAMEWORK OF A TEMPORARY EXHIBITION STAND

The invention relates to a device for assembling the framework of a temporary exhibition stand.

Temporary exhibition stands are already known (see FIG. 1) which consist of bottom horizontal profile members $1_1$ and top horizontal profile members $1_2$ fixed at their ends to vertical profile members 2 constituting uprights. Other vertical profile members of greater length $2_1$ forming posts and juxtaposed with uprights 2 may be provided to support various elements such as advertising panels, spotlights, etc. These uprights 2 and/or posts $2_1$ are maintained on the floor by base members 3 or by any other means. The horizontal cross-members $1_1$ and $1_2$ are provided with longitudinal grooves adapted to receive and maintain frames 4 within which are fixed the panels 5 which constitute the actual partition. In order to allow the frames 4 and their panels 5 to be placed in position, the bottom cross member $1_1$ and the top cross member $1_2$ comprise a longitudinal groove, the groove in the upper profile member being, however, deeper than the groove in the lower profile member so that first of all the top edge of the frame can be introduced into the groove in the upper cross member after which the frame can be lowered in the plane of the partition by positioning the bottom edge in the groove in the lower cross member in which it is maintained by its own weight.

Furthermore, the horizontal cross members quite often have to be connected at some midway point along their length to other horizontal cross members in order, for instance, to form fitting rooms 6, wardrobes $6_1$ or any other element of a stand installation which it might be desirable to attach to the framework.

It has however become manifest that these exhibition stands pose various problems, particularly in connection with their assembly and dismantling which have to be performed rapidly, and with regard to the manner in which they are assembled, which must be solid, the assembly means having furthermore to be designed in such a way as to allow them to be used again a great number of times without deterioration.

These problems cannot be resolved by currently known stand framework assembly means which employ screws or bolts which involve excessively long assembly and dismantling times and which do not permit of a sufficiently rugged, rigid and accurate assembly of the various uprights and their cross members.

It is a particular object of the present invention to remedy these drawbacks and to define a device for assembling cross members on their uprights, which makes it possible to place the upper cross member $1_2$ at two levels, a high level permitting positioning of the frames 4 in the grooves, and a low level in which the groove in the upper horizontal cross member is more deeply engaged over the top edge of the frame in order to lock it in place.

To this end, the invention is characterised in that the uprights comprise at their upper ends longitudinal slots situated in the bottom of dovetailed grooves, these slots terminating at the top end of the uprights which is adjacent the end of the top cross member which is to be assembled and in that a hub is disposed in these slots, the said hub comprising at least one heel which is disposed transversely in a dovetailed groove, at least one ball maintained in an orifice in the hub in such a way as to project into the dovetailed groove above the heel and a rod sliding in the hub against the action of a spring, the rod being provided with a notch and being adapted to assume two positions, in one of which the notch in the rod is situated at the level of the ball and allows it to move out of the groove to allow passage of the bolt, while in the other position, the rod locks the ball in a position projecting into the groove, maintaining the bolt either in a raised position, above the ball, or in a lowered position, between the heel and the ball.

According to another characteristic of the invention, the top and bottom cross members are identical and comprise two oppositely disposed longitudinal grooves of different depths.

According to another characteristic of the invention, the cross members comprise at their ends on the one hand a bolt and on the other a spring-loaded catch, the said bolt and the said catch being disposed in the plane of the two grooves of different depths.

According to another characteristic feature of the invention, the cross members comprise two longitudinal and opposingly directed grooves of dovetailed cross-section, orientated at a right-angle to the oppositely directed grooves of different depths, a longitudinal groove of shallow depth being provided in a position adjacent these dovetailed grooves in such a way as to co-operate with the spring loaded catch of another cross member of which the bolt is housed in the adjacent dovetailed groove.

By way of non-limitative example, the invention is illustrated in the accompanying drawings, in which:

FIG. 7 is a perspective view of the top end of an upright provided with the assembly device;

FIG. 8 is a perspective view of another embodiment of locking bolt;

FIG. 9 is a front view of the assembly bolt in FIG. 8;

FIG. 12 is a side view of another embodiment of bolt;

FIG. 13 is a head-on view of FIG. 12;

FIG. 14 is an elevation showing one of the parts of the socket which houses the bolt in FIG. 12;

FIG. 15 is a cross-section taken on the line A—A through the two assembled parts of the socket shown in FIG. 14;

Figure 1:
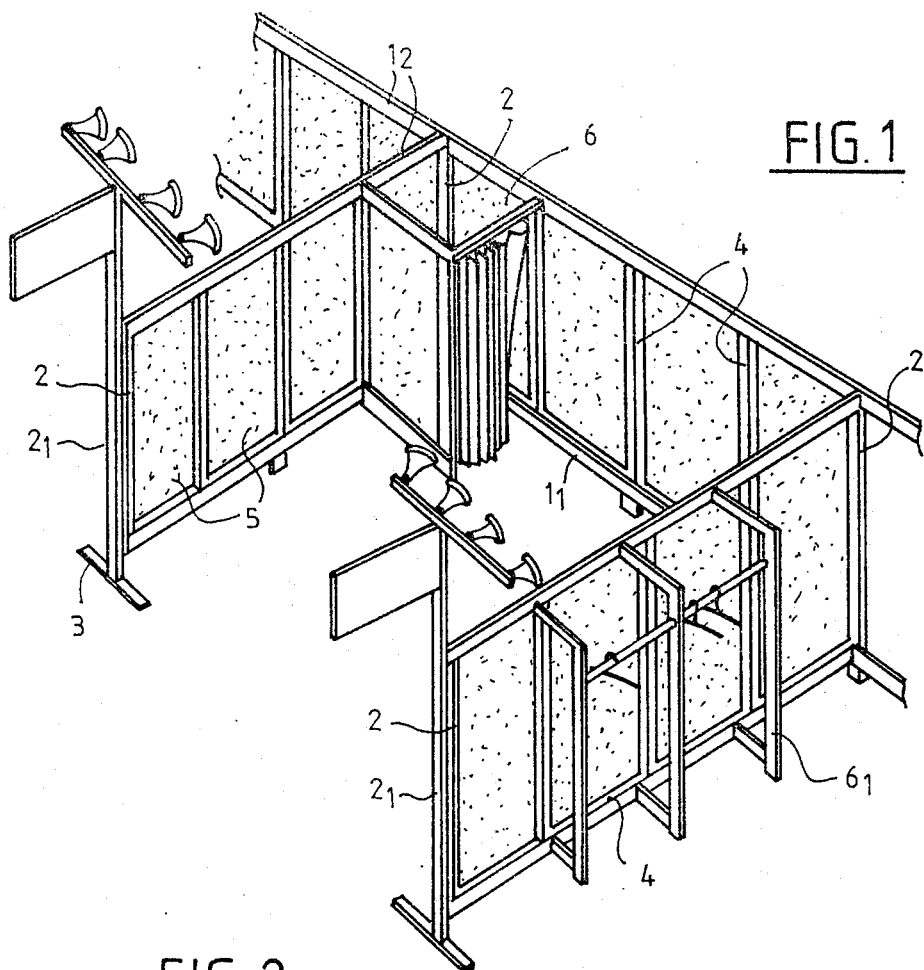
FIG. 1 is a perspective view of a known type of stand.

Consequently, the object of the present invention is to ensure rapid and rigid assembly of the bottom cross member $1_1$ and top cross member $1_2$ on uprights 2, this assembly being further more such that the top cross member $1_2$ can be placed in a high position during fitting of the frames 4, then in a low position when the frames of a partition have been positioned the low position permitting locking of the frames in the bottom of the grooves in the top and bottom cross members, ensuring longitudinal bracing of the partition, according to its plane, due to the use of rigid rectangular frames.

Locking of the cross members on the uprights is achieved by a bolt 7 which is fixed to the ends of the cross members $1_1$-$1_2$ (see FIGS. 2 and 4) and which becomes housed in one of the longitudinal dovetailed grooves $8_1$ in a profiled member of square cross-section 8 (see FIGS. 2 and 3) which constitutes the upright 2.

The length of the bolt 7 and its shape correspond to those of the dovetailed groove $8_1$, the bolt 7 being connected to its base $7_1$ by a cylindrical rod $7_2$, the diameter of which corresponds substantially to the width of the bolt 7 and to the width of the opening of the dovetailed groove $8_1$.

Figure 4:
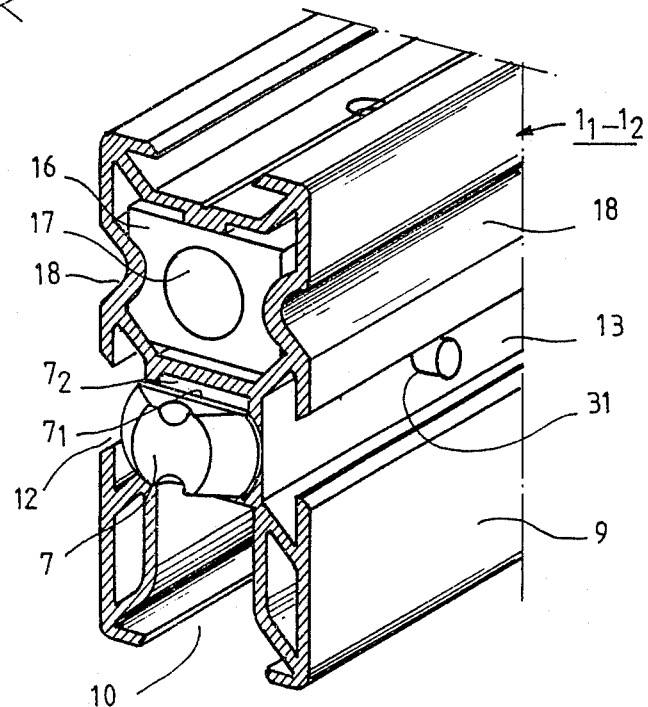
FIG. 4 is a perspective view of the end of a cross member.

The base which is square section, $7_1$, is housed in a longitudinal passage of corresponding cross-section formed in the profiled member 9 which constitutes the cross members $1_1$ and $1_2$ (FIG. 4).

This profiled member 9 which is of generally rectangular cross-section has on two of its opposite sides grooves 10, 11 of different depths, so that the shallower groove 11 is intended to receive the bottom edge of a frame 4, while the deeper groove 10 is intended to receive the top edge of this frame. Two other dovetailed grooves 12 and 13 are provided on the two other opposite sides of the profiled member and are therefore perpendicular to the grooves 10 and 11, these grooves likewise being intended to receive assembly bolts, as will be seen hereinafter, when it is desired to assemble a cross member to another cross member.

The central part of the profiled member is occupied by two longitudinal passages 14 and 15 which are disposed one above the other in the plane of the grooves 10 and 11, the square cross-section passage 14 receiving the base $7_1$ of the bolt 7 while the passage 15 receives a stud 16 which constitutes a spring loaded bolt and which for this purpose comprises a housing in which there is a ball or the like 17 biased by a spring $17_1$.

The two faces of the profiled member 9 which incorporate the dovetailed grooves 12 and 13 are likewise provided with a longitudinal groove 18, of which the distance from the grooves 12 and 13 corresponds to the distance of the ball 17 from the bolt 7 in order to constitute a means of locking the angular position of a cross member which is assembled at a point midway along the length of the other cross member.

The profiled member 8 which constitutes the uprights 2 likewise comprises a central passage $8_2$ inside which is housed the hub 19 of the assembly device.

For this purpose, the top end of the profiled member 8 is provided with slots $8_3$ which terminate in the bottom of dovetailed grooves $8_1$ and the length of which corresponds to the length of the hub 19.

Figure 6:
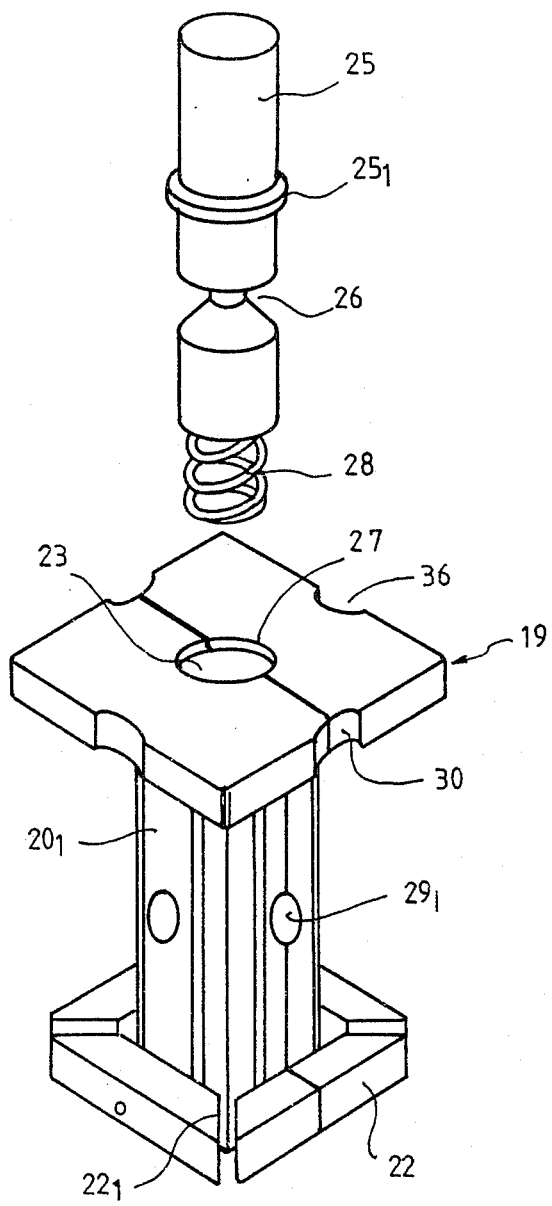
FIG. 6 is a perspective view of the hub of the assembly device and of its operating button.

The hub 19 of the assembly device comprises a stem 20 of square cross-section (see FIG. 6), the cross-section of which corresponds to that of the central passage $8_2$ in the profiled member 8. This stem is bounded at its ends by two flanges 21 and 22 of which the flange 21 is adapted to rest on the top end of the profile member 8 and has dimensions corresponding to the cross-section of this profiled member while the other flange 22 has at its corners Y-shaped slots $22_1$ corresponding to the Y-shaped partitions $8_4$ connecting the corners of the passage $8_2$ to two corners of the periphery of the profiled member (see FIG. 3).

Figure 2:
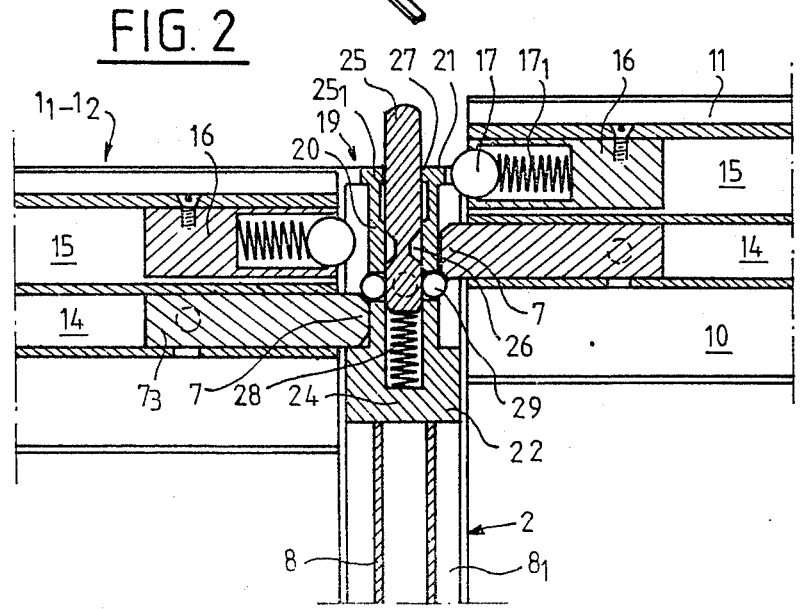
FIG. 2 is a cross-section through the assembly of two cross members on the top end of an upright, one of the cross members being shown in the low position and the other in the high position.
Figure 3:
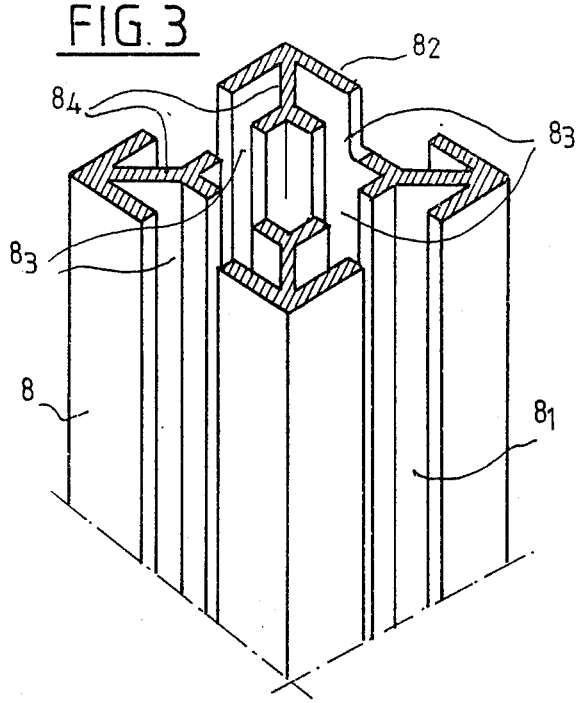
FIG. 3 is a perspective view of the top end of an upright.

The stem 20 of the hub 19 is provided with a central orifice 23 occluded at its bottom end at 24 (see FIG. 2). This passage accommodates a control rod 25 of corresponding cross-section which is provided with an annular groove 26.

This rod 25 comprises a collar $25_1$ which bears on an inner returned edge 27 on the edge of the central orifice 23 so that the rod 25 is maintained in an axial attitude and is adapted to slide on the orifice 23 against the action of a spring 28.

The stem 20 which comprises longitudinal ribs $20_1$ which fit into the slots $8_3$ of the profiled members 8, likewise comprises transverse bores $29_1$ which terminate in the bottom of the dovetailed grooves $8_1$. Held in these bores are balls 29 which, in the rest position, bear on the periphery of the rod 25 in such a way as to project into the dovetailed grooves $8_1$. On the other hand, when the rod 25 is pushed in, the groove 26 attains the height of the balls 29 which allows them to move back into the hub to allow passage of the bolt 7.

This assembly device operates in the following manner. The bolt 7 disposed at the ends of the cross members (profiled members 9) are smaller in their width than the opening of the dovetailed grooves $8_1$ and the bolts 7 of these profiled members can be introduced longitudinally into the grooves $8_1$ in order than to be pivoted through 90° so that they are positioned transversely to the grooves $8_1$, as is shown on the right-hand side of FIG. 2. In this position, the bolt 7 is situated above a ball 29 and the ball 17 of the spring loaded catch 16 becomes housed in a notch 30 in the periphery of the top flange 21. The profiled member 9 which constitutes an upper cross member $1_2$ is thus immobilised in a vertical plane in the high position due to the bolt bearing on a ball 29 and by reason of the ball 17 being housed in a notch 30.

In this high position of the upper cross member, the frames 4 can therefore be easily positioned in that firstly their top edge is introduced into the deeper groove 10 in a top profiled member $1_2$ and then, after pivoting, the bottom edge of the frames 4 is introduced into the shallower groove 11 in a bottom profiled member $1_1$.

When all the frames 4 of one and the same partition have been placed in position, it is sufficient for the operator to press on the rod 25 on the riser 2 until such time as the annular groove 26 is at the level of the balls 29, the effect of this being to allow the balls to move back and to allow the top cross member to be lowered into its low position (shown on the left-hand side of FIG. 2).

In this position the bolt 7 bears on the bottom flange 22 while it is locked in this position by the ball 29 which again projects into the dovetailed groove $8_1$ by virtue of the rod 25 having returned to its raised position under the action of the spring 28.

In this position, the ball 17 of the spring loaded catch 16 is housed in the opening of the dovetailed groove $8_1$ in the upright 2 in such a way as to co-operate in the locking of these horizontal cross members in the low position shown in FIG. 2.

Figure 5:
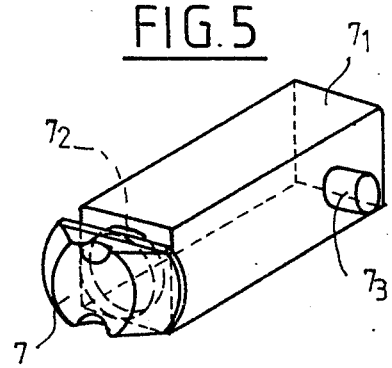
FIG. 5 is a perspective view of an embodiment of assembly bolt.

In the embodiment shown in FIGS. 2, 4 and 5, the base $7_1$ which is of square cross-section, of the bolt 7 is maintained in the passage 14 of corresponding cross-section and provided in a profiled member 9 by a locking rod $7_3$ biased by a spring (not shown) and which is housed in an orifice 31 of corresponding cross-section (FIG. 4).

An orifice of corresponding cross-section will however be provided in the bottom of the three grooves 12, 13 and 10 so that the bolt 7 can be turned through 90° so that its length is orientated either longitudinally or transversely in relation to the cross member 9.

The transverse disposition of the bolt 7 at the ends of the profiled members 9 is utilised to allow assembly of the cross members on the uprights, as illustrated in FIG. 2, while the longitudinal disposition of the bolts 7 at the ends of the profiled members 9 is utilised for assembling two cross members one to the other, these bolts 7 being accommodated in grooves 12 or 13 in such a way that the locking balls 17 are housed in the grooves 18. Thus, this assembly likewise makes it possible to assemble two horizontal cross members to each other, the plane of these cross members being maintained vertically.

In the embodiment shown in FIGS. 8 and 9, another form of bolt is illustrated and can be used whatever the type of assembly involved: for example of cross member to upright or of cross member to cross member, without requiring 90° pivoting of the bolt at the ends of the cross members.

In this case, the bolt 32 is orientated at 45° (diagonally) in relation to its square cross-section base 33 (see FIGS. 8 and 9), the bolt having a shape and dimensions such that it will fit longitudinally through the opening of the dovetailed grooves $8_1$, 12, 13 and then become locked in these grooves by a 45° pivoting action. The length of the bolt is therefore greater than the width of the dovetailed groove.

The ends of the bolt 32 are made in a prismatic shape, as shown in FIGS. 8 and 9, the bolt comprising furthermore two recesses $33_1$ and $33_2$ adapted to co-operate with the balls 29 either in the high position of the upper cross member or in the low position of this upper cross member.

Figure 10:
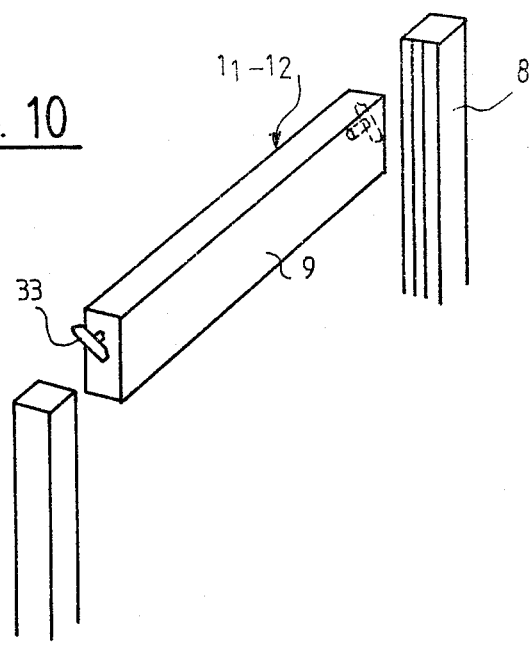
FIGS. 10 and 11 show in diagrammatic perspective two embodiments of the bolt in FIGS. 8 and 9 for assembling cross members to uprights or to other cross members.
Figure 11:
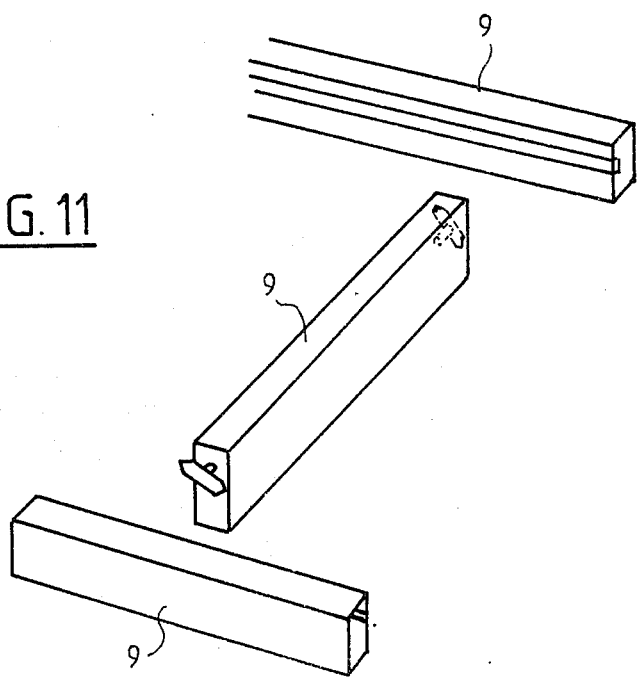

These bolts 33 disposed obliquely on the cross members 9 can therefore be used for assembling top or bottom horizontal cross members $1_1$, $1_2$ to uprights 8, as shown in FIG. 10, or on the other hand, for assembling cross members 9 at a midway point on the length of other cross members 9 by insertion of oblique bolts 33 into grooves 12 or 13. Likewise, if desired, these oblique bolts 33 can be used for connecting the top end of an upright to a midway point along a cross member.

According to the example of embodiment shown in FIGS. 12 to 15, the bolt 7 is rigid with a rod 35 mounted to slide axially in a socket 36 which is constituted by two identically shaped elements $36_1$ and $36_2$.

The rod 35 has a first zone of cylindrical cross-section $35_1$ followed by a second zone of cylindrical cross-section $35_2$, the latter being of narrowed cross-section, being itself extended by a zone $35_3$ of square cross-section, of which the length of the diagonal is greater than the diameter of the cylindrical cross-section $35_2$ in order to form end bearing surfaces at $35_4$.

The base 36 is provided with a housing 37 intended to receive for sliding motion the stem 35 of the bolt 7.

For this purpose, the housing 37 comprises a first cylindrical zone of circular cross-section $37_1$, the diameter of which corresponds to that of the zone $35_1$ and then a second cylindrical zone of circular cross-section $37_2$ the diameter of which corresponds to that of the zone $35_2$, this second zone $37_2$ being followed by a zone $37_3$ of square cross-section, the cross-section thereof corresponding to that of the zone of square cross-section $35_3$.

The two zones $37_2$ and $37_3$ bound inter se bearing surfaces $37_4$.

Provided between the bottom of the housing 37 and the square section zone $37_3$ is a fourth cylindrical zone $37_5$ of circular cross-section, the diameter of which is greater than the diagonal of the zone $35_3$ which is of square cross-section.

Furthermore, when the rod 35 of the bolt 7 is disposed in the housing 37 defined by the two parts $36_1$ and $36_2$ of the assembly 36, a spring (now shown) is placed between the bottom of the housing 37 and the zone $35_3$ of square cross-section so that this spring tends constantly to apply the bearing surfaces $35_4$ and $37_4$ one against the other so that the zones which are of square cross-section, $35_3$ and $37_3$, co-operate to block rotary movement of the bolt 7. On the other hand, if one pushes on the bolt 7 or in contrast if one pulls on the cross member $1_1$ which receives the socket 36, then in this case the rod 35 is caused to slide according to its axis X—X in the housing 37 in the socket, which has the axis Y—Y in order that the two zones $35_3$ and $37_3$ which are of square cross-section can against the action of the spring be axially cleared to allow rotation of the bolt 7 in relation to its socket and therefore in relation to the profiled member of the cross members $1_1$. This rotation is performed until such time as the bolt 7 has been displaced axially in relation to its socket and against the action of the spring and until such time as the zone $35_3$ which is of square cross-section has not, after a 90° rotation, dropped back into the housing $37_3$ which is of corresponding cross-section.

Therefore, the device will make it possible rapidly to position the bolt 7 either, as shown in FIG. 2 or at 90° in relation to this position in order indiscriminately to assemble one cross member in one of the dovetailed grooves $8_1$ of an upright or in one of the dovetailed grooves 12, 12 of another cross member.

Figure 16:
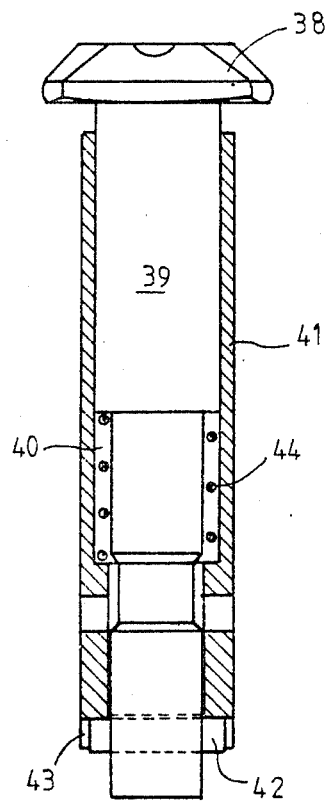
FIG. 16 is a cross-section through another embodiment of assembly device.
Figure 18:
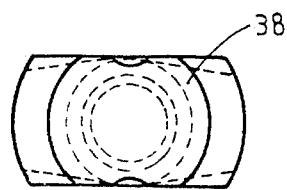
FIG. 18 is a view of the bolt in FIG. 16, from above.
Figure 17:
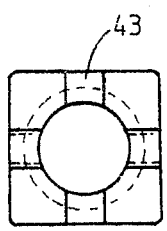
FIG. 17 is a view of the socket in FIG. 16, from below.

According to FIGS. 16, 17 and 18, another form of embodiment is illustrated in which the bolt 38 is provided with a staged cylindrical rod 39 mounted to slide axially in the housing 40 of a socket 41.

At its rear end, the rod 39 is provided with a portion 42 of transverse axis adapted to be seated in notches 43 which are set at an angle of 90° in relation to one another.

The rod 39 is mounted to slide axially and against the action of a spring 44 so that it is possible to offset the bolt 38 by an angle of 90° by exerting axial pressure on the bolt to clear the portion 42 from a notch 43 and to bring it into another notch which is offset by 90° in relation thereto.

I claim:

1. Framework of a temporary exhibition stand, said framework comprising vertical uprights (2) each provided with two ends, top and bottom horizontal cross members ($l_1$, $l_2$) each provided with two ends, said horizontal cross members being provided with a longitudinal groove (10, 11) receiving and maintaining panels (5) forming stand partitions, the vertical uprights comprising dovetailed longitudinal grooves ($8_1$) enclosing a central passage ($8_2$), each of said dovetailed grooves being adapted to receive a bolts (7) provided at the end of each cross member in order to assemble said cross members with the uprights, each upright (8) comprising at a top end thereof longitudinal slots ($8_3$) situated in the dovetailed grooves ($8_1$), the slots ($8_3$) terminating at the top end of the upright adjacent to the end of the top cross member which is to be assembled, a hub (19)

disposed in said last-mentioned slots, said hub having at least one heel (22) disposed transversely in one of said dovetailed grooves (8₁), at least one ball (29) maintained in an orifice in the hub and projecting into the dovetailed groove above said heel, a rod (25) sliding in said hub against the action of a spring (28), said rod being provided with a notch (26) and being adapted to assume two positions, in one of which the notch (26) on the rod (25) is situated in front of the ball (29) and permits said ball to be moved out of said last-mentioned dovetailed groove to allow passage of the bolt (7), while in the other position the rod (25) locks said ball (29) so that said ball projects into said last-mentioned dovetailed groove (8₁) and maintains the bolt either in a raised position above the ball or in a low position between the heel and the ball.

2. Framework according to claim 1, characterized in that the top and bottom cross members (1₁, 1₂) are identical and comprise two oppositely directed longitudinal grooves (10 and 11) of different depths.

3. Framework according to claim 2, characterized in that an end of each cross member (1₁, 1₂) houses said bolt (7, 33) and a spring loaded catch (16), said bolt and said spring loaded catch being disposed between said two grooves of different depths (10 and 11).

4. Framework according to claim 3, characterized in that the cross members (1₁, 1₂) comprise two longitudinal and oppositely directed grooves (12, 13) of dovetailed cross section orientated at a right-angle to the oppositely directed grooves of different depths (10, 11), a shallow longitudinal groove (18) being provided in a position adjacent to each of said dovetailed grooves (12, 13) such that a spring loaded catch (17) of another cross-member is received in said shallow groove and a bolt of said another cross-member is received in said dovetailed groove adjacent said shallow groove.

5. Framework according to claim 3, characterized in that each cross member (1₁, 1₂) comprises two inner longitudinal passages (14, 15), a first one of the passages receiving said bolt (7) and a second one of the passages receiving said spring loaded catch (17), the bolt having a base (7₁) of generally square cross-section housed in removable fashion in said first passage, said first passage having a generally square cross-section, each base (7₁) being provided with a spring loaded bolt (7₃) accommodated in removable manner in one of a plurality of orifices (31) provided in a wall of said first passage.

6. Framework according to claim 3, characterized in the said bolt (33) provided on said end of each cross member is inclined at 45° in relation to said base in order to be situated obliquely in relation to said oppositely directed grooves (10, 11) of different depths which are provided in the cross members.

7. Framework according to claim 1, characterized in that each bolt (7) provided at the end of a cross member is provided with a rod (35) mounted to slide axially and against the action of a spring in a housing (37) of a socket (36), the rod (35) and the housing (37) each having a zone of correspondingly square cross-section (35₃, 37₃) disposed so that said rod and said housing can occupy two relative axial positions in one of which the zones of square cross-section are axially clear of each other against the action of the spring in order to allow rotation of the bolt, while in the other axial position the zones of square cross-section are disposed and maintained one in the other under the action of the spring in order to block the bolt against rotary movement.

8. Framework according to claim 7, characterized in that the socket (36) is made in two parts (36₁, 36₂) one and the other being assembled according to an axial plane of connection.

9. Framework according to claim 7, characterized in that the zones of square cross-section (35₃, 37₃) of the rod and of the socket are adjacent to zones of narrowed cross-section (35₂, 37₂) defining bearing surfaces (35₄, 37₄) of said zones of square cross-section of said rod and said socket.

10. Framework according to claim 1, characterized in that each bolt (7) provided at the end of a cross member is provided with a rod (39) mounted to slide axially and against the action of a spring in a housing (40) of a socket (41), the rod (39) and the housing (40) each having a zone of correspondingly square cross-section, the rod (39) being provided with a portion (42) adapted to be housed in notches (43) offset by 90° in relation to one another and provided on the socket, in such a way that said rod and socket can occupy two relative axial positions in one of which said zones of square cross-section are axially clear of each other, being moved against the action of the spring to allow rotation of the bolt while in the other position the portion (42) is disposed and maintained in at least one notch under the action of the spring in order to secure the bolt against rotary movement.

* * * * *